March 10, 1970 V. R. NILSSON 3,499,577
METHOD AND APPARATUS FOR DOSING POWDER
Filed April 9, 1968
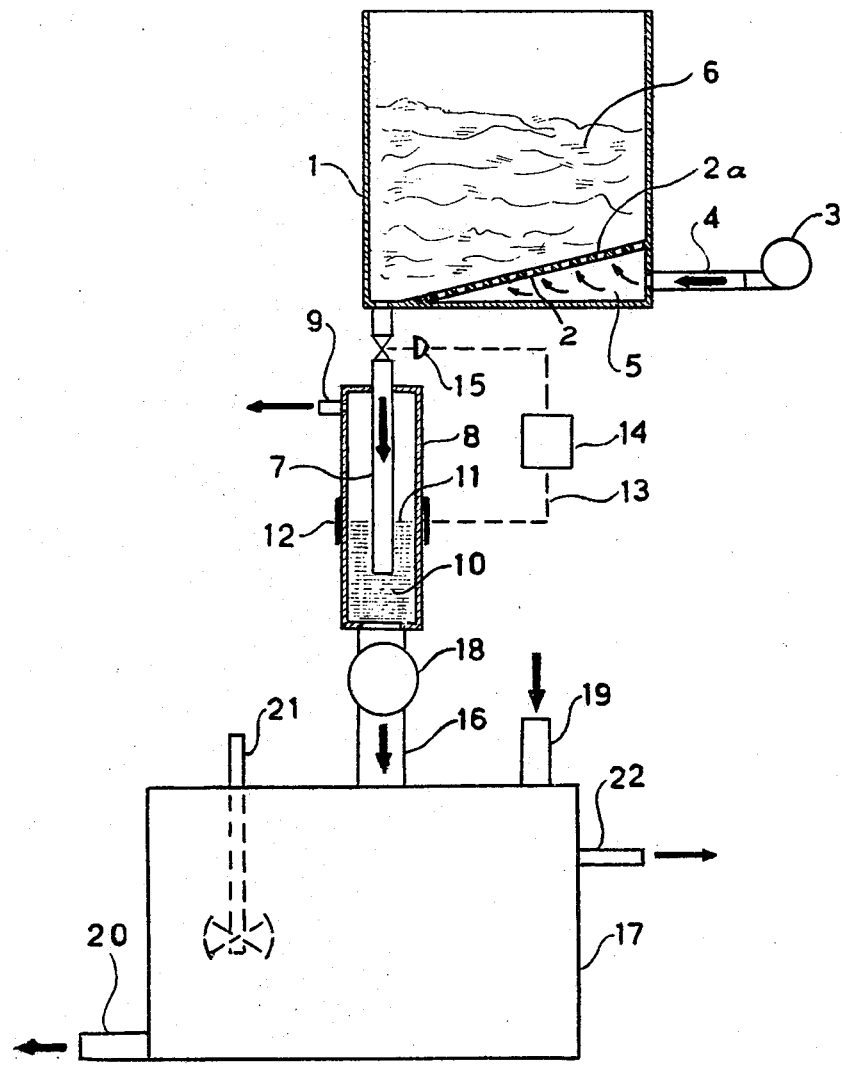
VILGOT RAYMOND NILSSON
*INVENTOR.*
BY
*Davis, Hoxie, Faithfull & Hapgood*
ATTORNEYS

3,499,577
METHOD AND APPARATUS FOR DOSING POWDER

Vilgot Raymond Nilsson, Hagersten, Sweden, assignor to Alfa-Laval AB, Tumba, Sweden, a corporation of Sweden
Filed Apr. 9, 1968, Ser. No. 719,996
Claims priority, application Sweden, Apr. 24, 1967, 5,688/67
Int. Cl. G01f 11/00
U.S. Cl. 222—1      7 Claims

ABSTRACT OF THE DISCLOSURE

A suspension of the powder in a gas is led downward into a powder mass maintained under a reduced gas pressure, as compared to the gas pressure at which the powder is suspended; and a dosing means discharges powder from the powder mass. Preferably, means are provided to maintain a substantially constant level of the powder mass, from which the powder is discharged by the dosing means into a treatment vessel which is also maintained under reduced pressure.

---

This invention relates to a method and apparatus for dosing a powder.

Heretofore, fatty or mineral oils have been bleached by mixing therewith a pulverous material such as bleaching earth, this operation being carried out batchwise or continuously under atmospheric pressure. However, because of the demand for better durability of the bleached oils, there has been a need for a bleaching system operable under vacuum and with de-aerated bleaching earth; and the present invention enables this need to be met.

According to the invention, the powder is suspended in a gas, and the powder suspension is led downward into a powder mass which is maintained under a lower gas pressure than that prevailing where the suspension is effected. From this powder mass, powder is discharged by a dosing means to the desired destination. In the continuous dosing of powder, the level of the powder mass is preferably kept substantially constant. Moreover, the powder is discharged by the dosing means against a gas pressure which is likewise reduced, which is particularly suitable in bleaching oils with bleaching earth.

The dosing apparatus of the invention comprises means for suspending a powder in a gas, a pipeline for the powder suspension which opens below the surface of a powder mass in a chamber, the latter being kept under reduced gas pressure, and a dosing means which discharges powder from the powder mass.

The invention is explained more in detail below with reference to the accompanying drawing, in which the single illustration is a schematic view, partly in section, of an embodiment of a plant for bleaching a fatty oil with bleaching earth.

In the drawing, a container 1 for bleaching earth is provided internally with an inclined perforated plate 2, on which a nylon cloth 2a is laid. A fan 3 blows air through a pipeline 4, and into a space 5 below the plate 2. In passing through the plate 2 and its nylon cloth, the air is distributed so as to cause the bleaching earth to whirl upwardly. This forms an air-born suspension 6 having a flow capacity of about the same magnitude as that of water. Accordingly, the bleaching earth suspension flows at least as easily as water downwards through a pipe 7, which opens into the lower part of a closed vessel 8. The latter, which may be made of glass or transparent plastic, is connected by a pipeline 9 to a vacuum pump (not shown). In the bottom part of the vessel 8, a mass 10 of bleaching earth is collected to form a level 11. This level is kept substantially constant by means of a level-measuring instrument comprising a cylindrical capacitor 12, which surrounds the vessel 8 at the region where the powder level changes can occur. The capacitor has an electrical connection 13 to a reference capacitor, which is a part of the level-measuring instrument and whose indicating part is shown at 14. The instrument 14 controls a valve 15 inserted in the pipeline 7.

A pipeline 16 extends downward from the bottom of the vessel 8 to a mixing vat 17. In the pipeline 16 is a dosing means 18, such as a motor-driven rotor provided with compartments which, as the rotor revolves, feed portions of bleaching earth downward into the vat 17. The latter has an inlet 19 for oil, an outlet 20 for oil and a motor-driven agitator 21. The passage of the oil through the vat 17 takes place in known manner in a constant quantity per unit of time. The vat 17 is connected by means of a pipeline 22 to a vacuum pump (not shown). In the vessel 8 as well as in the vat 17, an absolute pressure of about 10 mm. Hg is maintained.

In the operation of the illustrated apparatus, the bleaching earth suspension formed in the container 1 flows as a liquid down into the pipe 7, partly under the influence of the gravity and partly due to the pressure drop between the container 1 and the vessel 8. When the suspension enters the vessel 8, the suspension air expands so violently that the particle lumps explode into dust, more exactly in the pipe 7. The suspension is driven upward through the bleaching earth mass 10 to its surface 11 from the lower opening of the pipe 7. The bleaching earth proper is then separated from the suspension, so that only air reaches the outlet 9. The pipe 7 thus forms, in cooperation with the bleaching earth mass 10, a so called powder trap which effectively prevents powder dust from reaching the vacuum pipeline 9. Changes of the powder level 11 cause changes of the capacitance of the capacitor 12, and these changes cause deviations in the instrument 14. This instrument is arranged so that a rise of the level 11 causes throttling of the valve 15 and vice versa and for this reason the level 11 will be kept substantially constant. The dosed quantity of the bleaching earth, which falls into the vat 17, is mixed with the oil under vacuum conditions, so that a better durability of the treated oil as to oxidation is obtained.

I claim:
1. A method of dosing powder, which comprises suspending the powder in a gas, passing the powder suspension downward into a powder mass while maintaining said mass under reduced gas pressure, and discharging powder from said mass in dosed amount.

2. The method according to claim 1, comprising also the step of maintaining said powder mass at a substantially constant level.

3. The method according to claim 1, in which the powder is discharged from said mass against a reduced gas pressure.

4. Apparatus for dosing powder, which comprises a container, means for suspending the powder in a gas in said container, means forming a chamber maintained under a gas pressure lower than that of the suspending gas in said container, a powder mass in said chamber, a pipeline for the powder suspension leading from said container and opening into said powder mass below the surface thereof, and dosing means communicating with said powder mass for discharging powder therefrom.

5. Apparatus according to claim 4, comprising also means for maintaining a substantially constant level of the powder mass in said chamber.

6. Apparatus according to claim 4, comprising also a vacuum line connected to said chamber for maintaining said lower gas pressure therein.

7. Apparatus according to claim 4, comprising also a treatment vessel communicating with said dosing means for receiving the discharged powder, and a vacuum line connected to said vessel for maintaining a reduced pressure therein.

References Cited

UNITED STATES PATENTS

| | | | |
|---|---|---|---|
| 1,283,071 | 10/1918 | Cooper | 22—1 |
| 2,408,221 | 9/1946 | Mickel | 222—56 |
| 3,104,030 | 9/1963 | Howlett | 222—56 X |
| 3,188,144 | 6/1965 | Gmur et al. | 222—195 X |
| 3,255,921 | 6/1966 | Eveson et al. | 222—195 X |

FOREIGN PATENTS

| | | |
|---|---|---|
| 1,337,904 | 8/1963 | France. |
| 708,704 | 5/1954 | Great Britain. |

SAMUEL F. COLEMAN, Primary Examiner

U.S. Cl. X.R.

222—56, 195